United States Patent [19]

Kogure et al.

[11] Patent Number: 5,370,167
[45] Date of Patent: Dec. 6, 1994

[54] PNEUMATIC RADIAL TIRE FOR PASSENGER CAR

[75] Inventors: Tomohiko Kogure, Ashigara; Issey Nakakita, Hiratsuka, both of Japan

[73] Assignee: The Yokohama Rubber Co., Ltd., Tokyo, Japan

[21] Appl. No.: 850,365

[22] Filed: Mar. 12, 1992

[30] Foreign Application Priority Data

Apr. 12, 1991 [JP] Japan .................................. 3-079852

[51] Int. Cl.⁵ .......................... B60C 9/18; B60C 11/04
[52] U.S. Cl. .................................. 152/209 R; 152/537
[58] Field of Search ............. 152/209 R, 209 D, 526, 152/527, 537, 536

[56] References Cited

U.S. PATENT DOCUMENTS

| | | | |
|---|---|---|---|
| 3,851,692 | 12/1974 | Takemura et al. | 152/537 |
| 4,602,666 | 7/1986 | Kabe et al. | 152/537 |
| 4,773,459 | 9/1988 | Yamaoka et al. | 152/209 R |
| 4,854,360 | 8/1989 | Nagumo et al. | 152/529 |
| 4,884,607 | 12/1989 | Mori | 152/209 R |
| 4,947,916 | 8/1990 | Ishikawa et al. | 152/536 |
| 4,986,324 | 1/1991 | Suzuki et al. | 152/209 R |
| 5,000,239 | 3/1991 | Brayer et al. | 152/209 R |
| 5,135,038 | 8/1992 | Graas et al. | 152/209 R |

FOREIGN PATENT DOCUMENTS

| | | | |
|---|---|---|---|
| 0039904 | 4/1981 | Japan | 152/209 R |
| 2-127102 | 5/1990 | Japan | 152/209 R |
| 2066171 | 7/1981 | United Kingdom | 152/209 R |

OTHER PUBLICATIONS

"Pneumatic Tyre Design" E. C. Woods; 1955 pp. 32–34.
1992 Year Book The Tire and Rim Association, Inc., pp. 1-01, 1-06, 1-08, 1-10, and 1-12.

*Primary Examiner*—Michael W. Ball
*Assistant Examiner*—Nancy T. Krawczyk
*Attorney, Agent, or Firm*—Nikaido, Marmelstein, Murray & Oram

[57] ABSTRACT

A pneumatic radial tire for a passenger car, which includes a plurality of grooves provided on the surface of a tread and extending at least in a tire circumferential direction and a belt having a double layer structure and provided within the tread, characterized in that the depth of the grooves is in the range of 6.0 to 8.5 mm, the thickness of a rubber under the groove defined as the distance from the bottom of the groove to the outermost belt layer is in the range of 0.5 to 2.5 mm, and at least one layer of the belt comprises aramid fiber cords coated with a coat rubber having a modulus of elasticity at 50% elongation of 30 to 55 kgf/cm².

7 Claims, 3 Drawing Sheets

PNEUMATIC RADIAL TIRE FOR PASSENGER CAR

BACKGROUND OF THE INVENTION

The present invention relates to a pneumatic radial tire for a passenger car improved in the driving stability with a reduction in the weight of the tread belt structure.

Environmental pollution spreading on an earth scale in recent years has brought about a strong demand for a further lowering in the fuel consumption of vehicles, and, as a part of it, a reduction in the weight of the tire has become brought to the fore as a large technical task.

In a pneumatic radial tire for a passenger car, it is known that a high driving stability can be attained when the belt layer comprises steel cords because the steel cords are far superior in the strength and the modulus of elasticity to other fiber cords. The steel cords, however, unfavorably increase the weight of the tire and the fuel consumption due to its high specific gravity, so that it is difficult for them to cope with the above-described technical task.

Aramid fiber cords have been proposed as a tire cord material having properties close to the steel cords. They have a high strength and a modulus of elasticity comparable to those of the steel cords and can contribute to a reduction in the weight of the tire because the specific gravity is smaller than that of the steel cords. For example, it is known that the weight of the tire can be reduced by as large as about 5 to 8% through a mere replacement of the steel cords of the belt layer with the aramid fiber cords.

Since, however, the compressive rigidity of the aramid fiber cords is substantially equal to zero, the bending rigidity when a bending deformation is applied is disadvantageously low. For this reason, the cornering power in the case where the belt structure is the same as the belt structure comprising steel cords except that the cords alone are replaced with aramid fiber cords is as low as 75% of the cornering power of the belt layer comprising steel cords. Therefore, an attainment of the driving stability comparable to that of the tire having a belt structure comprising steel cords has been viewed as practically impossible when use is made of aramid fiber cords.

SUMMARY OF THE INVENTION

An object of the present invention is to provide a pneumatic radial tire for a passenger car which can exhibit a driving stability superior to that of the conventional tire having a belt layer comprising steel cords with a reduction in the weight of the tire through the use of aramid fiber cords in the belt structure.

In order to attain the above-described object, the present invention provides a pneumatic radial tire which includes a plurality of grooves provided on the surface of a tread and extending at least in a tire circumferential direction and a belt having a double layer structure and provided within the tread, characterized in that the depth of the grooves is in the range of 6.0 to 8.5 mm, the thickness of a rubber under the groove defined as the distance from the bottom of the groove to the outermost belt layer is in the range of 0.5 to 2.5 mm, and at least one layer of the belt comprises aramid fiber cords coated with a coat rubber having a modulus of elasticity at 50% elongation of 30 to 55 kgf/cm$^2$.

As described above, in the tire of the present invention, at least one belt layer comprises aramid fibers, and the groove depth and the thickness of rubber under the groove are smaller than those of the conventional tire. This constitution enables the weight of the tire to be made smaller than that of the conventional tire wherein use is made of a belt comprising steel cords. Further, a combination of the smaller groove depth of the tread surface and the smaller thickness of rubber under the groove with the use of a harder coat rubber for coating the aramid fibers than that in the conventional tire to increase the in-plane rigidity contributes to an attainment of a cornering power larger than that obtained in the conventional tire wherein use is made of a belt comprising steel cords.

DESCRIPTION OF THE PREFERRED EMBODIMENTS

Figure 2:
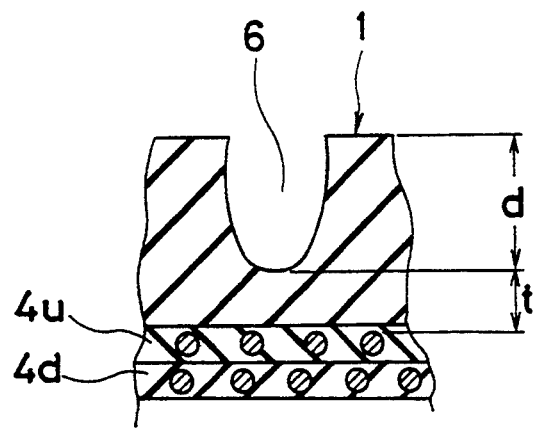
FIG. 2 is an enlarged sectional view of a main groove provided on a tread of the tire according to the present invention.

In the present invention, as shown in FIG. 2, the groove depth (d) is a distance measured perpendicularly to the tread surface to the deepest point of the bottom of the groove, and the thickness (t) of rubber under the groove is a distance from the deepest point of the bottom of the groove to the cord surface of the outermost belt layer (4u). Further, the modulus of elasticity at 50% elongation is a value measured at room temperature according to a method specified in JIS K 6301.

Figure 1:
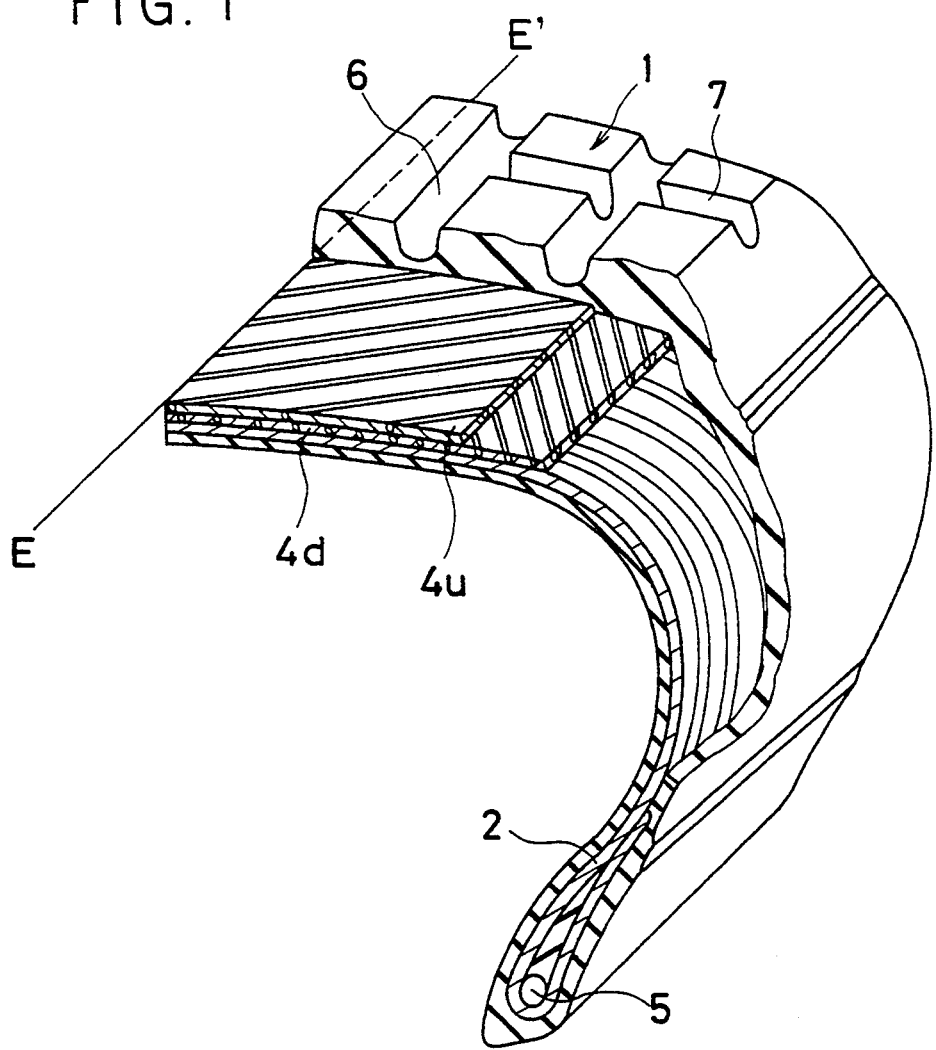
FIG. 1 is a partially cutaway schematic perspective view of a radial tire for a passenger car according to an embodiment of the present invention.

In FIGS. 1 and 2, numeral 1 denotes a tread, and numeral 2 a carcass layer comprising organic fiber cords such as nylon cords or polyester cords. The carcass layer 2 is folded back and wound up around left and right bead cores 5 from the inside of the tire towards the outside of the tire- The cord angle of the carcass layer 2 to the tire circumferential direction, EE′, is substantially 90°. In the tread 1, a belt comprising two layers, i.e., an inner belt layer 4d and an outer belt layer 4u each comprising aramid fiber cords, are disposed on the outside of the carcass layer 2 over one round of the tire. The cord angle of each of the inner belt layer 4d and the outer belt layer 4u to the tire circumferential direction EE′ is 5° to 40°, and the cords of the inner belt layer 4d and the cords of the outer belt layer 4u cross each other.

main grooves 6 extending in a tire circumferential direction and subgrooves 7 crossing the main grooves and provided on the surface of the tread 1. The groove depth, (d), of the main grooves 6 is in the range of 6.0 to 8.5 mm, and the thickness, (t), of rubber under the grooves is in the range of 0.5 to 2.5 nun. The belt layers 4d and 4u comprise aramid fiber cords coated with a coat rubber having a modulus of elasticity at 50 elongation of 30 to 55 kgf/cm$^2$.

In accomplishing the above-described invention, the present inventors have made many faceted studies on factors having an influence on the cornering power of the radial tire with a view to attaining the technical task on the reduction in the weight of the tire. As a result, as shown in detail in experiment examples which will be described later, they have found that the groove depth of the grooves provided on the tread surface along the tire circumferential direction and the thickness of rubber under the grooves are main factors governing the cornering power and the cornering power increases with reduction in the groove depth of the grooves in the tire circumferential direction and the thickness of rubber under the grooves. This tendency is independent of the form of the grooves in the tire circumferential direction which is straight or zigzag. Further, this is independent of whether or not subgrooves are provided in the tire width-wise direction. As described above, however, when the steel cords of the belt layer are replaced with the aramid fiber cords, a remarkable lowering of about 25% in the cornering power occurs. Therefore, it has been found that it is almost impossible to compensate for the 25% lowering of the cornering power through the technical measures involving the groove depth of the grooves in the tire circumferential direction and the thickness of rubber under the grooves alone. It has been found that the object of the present invention can be attained through the use of aramid fiber cords in combination with an enhancement in the modulus of elasticity at 50% elongation of the coat rubber for coating the aramid fiber cords to a level higher than that used in the conventional belt layer comprising steel cords.

The present invention will now be described in more detail with reference to the following experiment examples.

Figure 3:
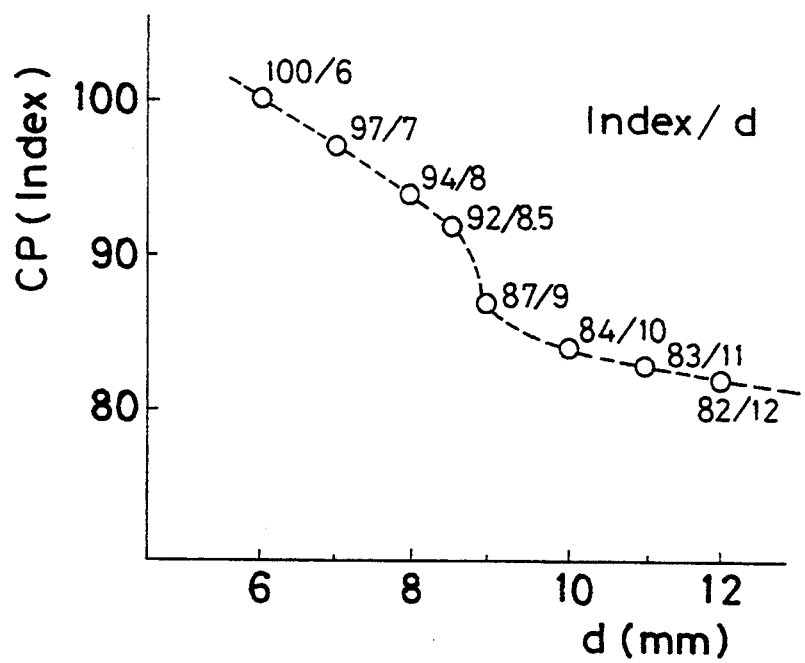
FIG. 3 is a graph showing the relationship between the groove depth, (d), and the cornering power, CP.

The results of an experiment on the relationship between the groove depth, (d) and the cornering power, CP, are shown in FIG. 3. The experiment was conducted on eight radial tires having the following identical tire specifications with only the groove depth, (d), being varied as 6 mm, 7 mm, 8 mm, 8.5 mm, 9 mm, 10 mm, 11 mm and 12 mm.

Specifications for tires:
  Tread structure: as shown in FIG. 1
  Tire size: 185/70R13
  Belt structure: two belt layers
    width: upper layer/lower layer = 120 mm/130 mm
    Cords: aramid fiber 1500D/2
    End count=45 ends/50 mm
    Modulus of elasticity at 50% elongation of coat rubber=25 kgf/cm$^2$
  Thickness of rubber under grooves, t=3.0 mm The cornering power, CP, was measured as follows. In a drum test, when the tire was run under a load of 450 kgf at a speed of 10 km/hr, the lateral force at a right slip angle of 2° and the lateral force at a left slip angle of 1° were measured, and the average value of both the measurements (average value of the absolute values) was expressed by an index using the measurement value of the tire having a groove depth of 6 mm as 100.

Figure 4:
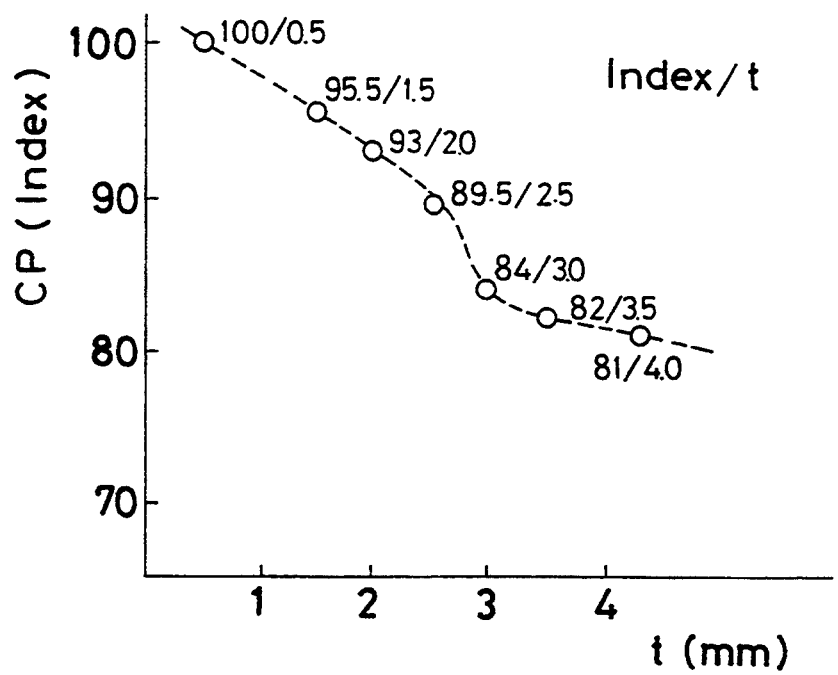
FIG. 4 is a graph showing the relationship between the thickness, (t), of rubber under the grooves and the cornering power, CP.

The results of an experiment on the relationship between the thickness, (t), of rubber under the grooves and the cornering power, CP, are shown in Fig. 4. This experiment was conducted on seven tires having the same tread structure, tire size and belt structure as those of the tires used in the above-described experiment and an identical groove depth, (d), of 8.5 mm with only the thickness, (t), of rubber under the grooves being varied as 0.5 mm, 1.5 mm, 2.0 mm, 2.5 mm, 3.0 mm, 3.5 mm and 4.0 mm. The cornering power, CP, was measured in the same manner as that described above and expressed by an index using the measurement value of the tire having a thickness, (t), of rubber under the grooves of 0.5 mm as 100.

Regarding the groove depth, (d), as is apparent from FIG. 3, the cornering power, CP, increases with reduction in groove depth, (d), and rapidly increases when the groove depth, (d), becomes 8.5 mm or less. This tendency is not limited to the tire having the above-described size used in the test, and a similar tendency is observed also in tires having other sizes.

In the conventional radial tire, the groove depth, (d), is generally 8 to 11 mm. On the other hand, in the present invention, from the results shown in FIG. 3, the groove depth, (d), is limited to 6.0 to 8.5 mm, preferably 6.0 to 7.5 min. The lower limit, i.e., 6.0 mm, is determined based on the abrasion life, and when the groove depth is smaller than this value, the practicability becomes poor.

Regarding the thickness, (t), of rubber under the grooves, from FIG. 4, it is apparent that the cornering power, CP, increases with reduction in thickness, (t), of rubber under the grooves and rapidly increases particularly when the thickness becomes 2.5 mm or less. This tendency is observed also in tires having other sizes. In the conventional radial tire, the thickness, (t), of rubber under the grooves is generally 2.5 to 4 mm. On the other hand, in the present invention, from the results shown in FIG. 4, the thickness, (t), of rubber under the grooves is limited to 0.5 to 2.5 mm, preferably 1.0 to 2.0 mm. The lower limit of the thickness, i.e., 0.5 mm, is a limit for protecting the belt cords and preventing the breaking of the cords.

As described above, the cornering power, CP, increases with reduction in groove depth, (d), of the grooves provided on the tread (main grooves) and the thickness, (t), of rubber under the grooves. The effect of improving the cornering power, CP, derived from the groove depth, (d), however, is up to about 9% of that in the case of the lower limit of the groove depth, (d), i.e., 8.5 mm of the conventional tire even when use is made of the lower limit of the groove depth, (d), i.e. 6.0 mm. Further, the effect of improving the cornering power, CP, derived from the thickness, (d), of rubber under the grooves, however, is up to about 19% of that in the case of the lower limit of the thickness, (t), of rubber under the grooves, i.e, 3.0 mm, of the conventional tire even when use is made of the lower limit of the thickness, (t), of rubber under the grooves, i.e., 0.5 mm. For this reason, mere limitation of the groove depth, (d), and the thickness, (t), of rubber under the grooves cannot compensate for low bending rigidity of the belt layer comprising aramid fiber cords, so that it is difficult to attain a cornering power higher than that obtained in the conventional belt layer comprising steel cords.

In the present invention, the cornering power which remains insufficient due to limitation of the groove depth, (d), and the thickness, (t), of rubber under the grooves can be compensated for and increased to a level higher than that obtained in the belt layer comprising steel cords by increasing the modulus of elasticity at a low elongation of the coat rubber of the belt layer comprising aramid fiber cords.

Figure 5:
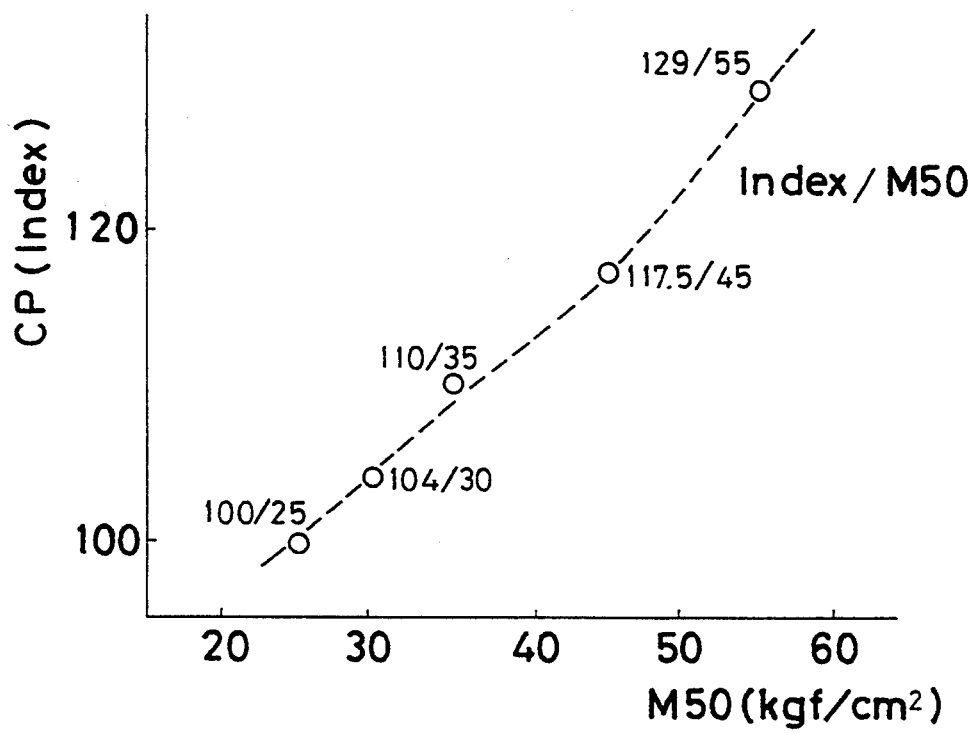
FIG. 5 is a graph showing the relationship between the modulus of elasticity at 50% elongation, M50, and the cornering power, CP.

The results of an experiment on the relationship between the modulus of elasticity at 50% elongation M50, of the coat rubber and the cornering power, CP, are shown in FIG. 5. This experiment was conducted on five tires having the same tread structure, tire size and belt structure as those of the tires used in the experiment in connection with FIG. 3 and an identical groove depth, (d), of 7.0 mm and an identical thickness, (t), of rubber under the grooves of 1.5 mm with only the modulus of elasticity at 50% elongation, M50, of the coat rubber being varied as 25 kgf/cm$^2$, 30 kgf/cm$^2$, 35 kqf/cm$^2$, 45 kgf/cm$^2$ and 55 kgf/cm$^2$. The cornering power, CP, was measured in the same manner as that in the case of the experiment in connection with FIG. 3 and expressed by an index using the measurement value at a 50% elongation, M50, of 25 kgf/cm$^2$ as 100.

As is apparent from FIG. 5, the cornering power, CP, linearly increases in proportion to an increase in the modulus of elasticity at 50% elongation, M50. In the present invention, the modulus of elasticity at 50% elongation, M50, of the coat rubber is limited to 30 to 55 kgf/cm$^2$.

In the coat rubber used in the conventional belt cords, there was no need of increasing the hardness because an increase in the hardness brought about a deterioration in the processability, so that the modulus of elasticity at 50% elongation, M50, was up to about 27 kgf/cm$^2$ even in the case of a hard coat rubber. By contrast, in the present invention, use is made of a rubber having a modulus of elasticity at 50% elongation, M50, of 30 kgf/cm$^2$ or more, preferably 35 kgf/cm$^2$ or more, for the purpose of compensating for low bending rigidity of aramid fiber cords. The larger the modulus of elasticity at 50% elongation, M50 , of the coat rubber, the better the results. However, when the modulus of elasticity is excessively high, the processability deteriorates and the durability of the belt layer lowers due to a lowering in breaking elongation. For this reason, the upper limit is 55 kgf/cm$^2$, preferably 45 kgf/cm$^2$.

The aramid fiber cord used in the belt layer according to the present invention is preferably in the form of a filament having a total denier, D, of 500 to 5000D, preferably 2000 to 3000D. This twisted cord is subjected to a surface treatment with an adhesive, such as an epoxy resin and resorcin/formalin/latex (RFL), for the purpose of improving the adhesion the cord to the coat rubber. The cords subjected to the surface treatment are woven into a tire cord fabric in the form a reed screen which is then coated with the above-described coat rubber having a large modulus of elasticity at a low elongation so that the thickness becomes 0.1 to 1.0 mm larger than the cord diameter. It is preferred to conduct the coating in such a manner that the thickness is a cord diameter plus 0.1 to 0.6 mm.

In the present invention, both the two layers comprise aramid fiber cords. If necessary, the belt has such a structure that one layer comprises aramid fiber cords while the other layer comprises steel cords. Further, the two belt layers are laminated on top of the other in such a manner that the cord angle is 5° to 40° , preferably 15° to 30° to the tire circumferential direction and the belt cords cross each other. In this case, the width in the tire meridian direction is 80 to 130%, preferably 90 to 110% of the ground contact width of the tire.

Thus, the weight of the tire can be made smaller than that of the conventional tire having a belt layer comprising steel cords when at least one of the two belt layers comprises aramid fiber cords and further the groove depth, (d), and the thickness, (t), of rubber under the grooves is made smaller than those in the case of the conventional tire. Further, the synergistic effect attained by reducing the groove depth, (d), and the thickness, (t), of rubber under the grooves and increasing the in-plane rigidity through the use of a coat rubber having a larger hardness than that in the case of the conventional tire renders the cornering power better than that of the conventional tire having a belt layer comprising steel cords, which contributes to an improvement in the driving stability.

EXAMPLE 1

A tire 1 of the present invention having a tire structure shown in FIG. 1 and a tread pattern formed on the tread was prepared according to the specifications listed in Table 1.

Tread pattern: Four straight main grooves having a width of 6 mm were provided within the ground contact region of the tread along the tire circumferential direction to form five ribs substantially equal to each other in the width. A plurality of subgrooves having a width of 4 mm and the same groove depth as that of the straight main groove are formed at intervals of about 26 mm in the radial direction of the tire to drive the ribs, thereby forming a block pattern wherein 72 rectangular blocks are arranged on the tire circumference.

Four types of tires, i.e., tires 2 and 3 of the present invention and comparative tires 1 and 2, were prepared according to the same specifications as those in the tire 1 of the present invention, except that rubber compositions E, C, A and B listed in Table 2 were used as the coat rubber for the belt layer and the groove depth, (d), and the thickness, (t), of rubber under the grooves were changed as shown in Table 4. For comparison, a conventional tire was prepared according to the same specifications as those of the tire 1 of the present invention, except that steel cords having a cord structure of 1×5 (0.25 mm) were used instead of aramid fiber cords and rubber composition A was used.

These six types of tires were subjected to an evaluation of the cornering power, CP, in the same manner as that in the case of FIG. 3. The results of evaluation are given in Table 4 together with the comparison of the weight per tire. The CP value was expressed by an index using the measurement value of the conventional tire as 100, and the weight of the tire was expressed based on the weight of the conventional tire.

TABLE 1

| Tire size | | 185/70R13 |
| --- | --- | --- |
| tread pattern | | FIG. 3 |
| belt layer | coat rubber | rubber composition F in Table 2 |
| | type of cords | aramid fibers of 1500D/2 |
| | cord angle in the tire circumferential direction | 21° |
| | end count | 45 ends/50 mm in width |
| | width of upper belt layer | 120 mm |
| | width of lower belt layer | 130 mm |
| tread rubber | | rubber composition specified in Table 3 |
| groove depth, (d) | | 8.5 mm |
| thickness, (t), of rubber under grooves | | 2.5 mm |

TABLE 2

|  |  | Rubber composition | | | | | |
| --- | --- | --- | --- | --- | --- | --- | --- |
|  |  | A | B | C | D | E | F |
| for-mu-la-tion | natural rubber | 100 | 100 | 95 | 90 | 90 | 85 |
|  | liquid rubber[1] | — | — | 5 | 10 | 10 | 15 |
|  | carbon black | 60 | 60 | 69 | 78 | 78 | 85 |
|  | zinc oxide | 10 | 10 | 10 | 10 | 10 | 10 |
|  | process oil | — | — | — | — | — | 3 |
|  | resorcin precondensate[2] | 1 | 2 | 2 | 2 | 3 | 4 |
|  | HMMM[3] | 2 | 3.5 | 3.5 | 3.5 | 6 | 7 |
|  | adhesion acid[4] | 2 | 2 | 2 | 2 | 2 | 2 |
|  | antioxidant[5] | 1 | 1 | 1 | 1 | 1 | 1 |
|  | sulfur[6] | 8 | 8 | 8 | 8 | 8 | 8 |
|  | vulcanization accelerator[7] | 0.5 | 0.5 | 0.5 | 0.5 | 0.5 | 0.5 |
| M50 (kgf/cm$^2$) |  | 20 | 25 | 30 | 40 | 45 | 55 |

Note: In Table 2, the unit of the amount of compounding of each ingredient is parts by weight.
[1] polyisoprene rubber (LIR-50 manufactured by Kurarei Isoprene Chemical Co., Ltd.)
[2] B-18S manufactured by Koppers
[3] abbreviation for hexamethoxymethylmelamine
[4] cobalt naphthenate (manufactured by Dainippon Ink & Chemicals, Inc.)
[5] "Nocrac" 6C manufactured by Ouchi Shinko Chemical Industrial Co., Ltd.
[6] 80% insoluble sulfur
[7] "Nocceler MSA-G" (OBS) manufactured by Ouchi Shinko Chemical Industrial Co., Ltd.

TABLE 3

| Compounding ingredient | Amount of compounding (pt. wt) |
| --- | --- |
| SBR[1] | 137.5 |
| zinc oxide | 1.5 |
| stearic acid | 2.0 |
| antioxidant[2] | 1.8 |
| wax[3] | 1.0 |
| carbon black HAF | 70.0 |
| aromatic oil | 3.0 |
| vulcanization accelerator[4] | 2.5 |
| sulfur powder | 2.1 |

Note: In Table 3,
[1] styrene-butadiene copolymer rubber "Nipol" 1712 manufactured by Nippon Zeon Co., Ltd.
[2] "Nocrac" 6C manufactured by Ouchi Shinko Chemical Industrial Co., Ltd.
[3] "Sunnoc" manufactured by Ouchi Shinko Chemical Industrial Co., Ltd.
[4] "Sanceler" 232-MG manufactured by Sanshin Chemcial Ind. Co., Ltd.

TABLE 4

|  | Conventional Tire | Comparative Tire 1 | Tire 1 of Present Invention | Tire 2 of Present Invention | Comparative Tire 2 | Tire 3 of Present Invention |
| --- | --- | --- | --- | --- | --- | --- |
| d (mm) | 8.5 | 8.5 | 8.5 | 6.0 | 6.0 | 6.0 |
| t (mm) | 3.0 | 3.0 | 2.5 | 2.5 | 0.5 | 0.5 |
| type of belt cords | steel steel | aramid aramid | aramid aramid | aramid aramid | aramid aramid | aramid aramid |
| rubber composition | A | A | F | E | B | C |
| M50 | 20 | 20 | 55 | 45 | 25 | 30 |
| CP index | 100 | 75 | 105 | 104 | 98 | 103 |
| weight of tire (g) | reference | −525 | −690 | −1370 | −2100 | −2100 |

As is apparent from Table 4, when steel cords in the conventional tire are merely replaced with aramid fiber cords, although the weight of the tire can be reduced by 525 g, the cornering power, CP, lowers by as large as 25%. By contrast, the tire 1 of the present invention wherein the thickness, t, of rubber under the grooves is 2.5 mm and the modulus of elasticity at 50% elongation, M50, of the coat rubber is 55 kgf/cm$^2$ can reduce the weight of the tire and, at the same time, can improve the cornering power, CP, to a level higher than that of the conventional tire despite the use of aramid fiber cords. Further, the tire 2 of the present invention wherein the groove depth, d, is 6.0 mm, i.e., the lower limit, can remarkably reduce the weight of the tire and, at the same time, can make the cornering power, CP, larger than that of the conventional tire although the modulus of elasticity at 50% elongation, M50 (50 kgf/cm$^2$) is lower than that of the tire 1 of the present invention. In the comparative tire 2, although the groove depth, d, and the thickness, t, of rubber under the grooves are 6.0 mm and 5.0 mm, respectively, since the modulus of elasticity at 50% elongation is low, the cornering power, CP, is inferior to that of the conventional tire. In the tire 2 of the present invention wherein the modulus of elasticity at 50% elongation, M50, of the comparative tire 2 has been increased to 30 kgf/cm$^2$, the cornering power, CP, is larger than that of the conventional tire.

EXAMPLE 2

Tire 4 of the present invention was prepared according to the same specifications as those of the tire 2 of the present invention prepared in Example 1, except that only the inner belt layer of the two layers constituting the belt was replaced with steel cords constituting the belt of the conventional tire.

The cornering power, CP, of the tire 4 of the present invention was evaluated in the same manner as that in connection with FIG. 3. The evaluation value was 124 in terms of an index using the CP value of the conventional tire as 100. Further, the weight of the tire could be reduced by 1100 g. Thus, even when a steel belt is used as one of two belt layers, it is possible to improve the cornering power, CP, while reducing the weight of the tire, by increasing the modulus of elasticity at 50% elongation of the belt coat rubber.

What is claimed is:

1. A pneumatic radial tire for a passenger car which includes a plurality of grooves provided on the surface of a tread and extending at least in a tire circumferential direction and a belt having a double layer structure and provided within the tread, characterized in that the depth of the grooves is in the range of 6.0 to 8.5 mm, the thickness of a rubber under the groove defined as the distance from the bottom of the groove to the cord surface of the outermost belt layer independent of any belt cover layer is in the range of 1.0 to 2.0 mm, and at least one layer of the belt comprises aramid fiber cords coated with a coat rubber having a modulus of elasticity at 50% elongation of 35 to 55 kgf/cm$^2$.

2. A pneumatic radial tire for a passenger car according to claim 1, wherein one of the belt layers comprises aramid fiber cords and the other belt layer comprises steel cords.

3. A pneumatic radial tire for a passenger car according to claim 1, wherein both the two belt layers comprise aramid fiber cords.

4. A pneumatic radial tire for a passenger car according to claim 1, wherein said aramid fiber cord comprises filaments and said cord has a total denier of 2000 to to 3000 D.

5. A pneumatic radial tire for a passenger car according to claim 1, wherein the two belt layers are laminated on top of the other in such a manner that the belt cords constituting said belt layers cross each other at an angle of 15° to 30° to the tire circumferential direction and the width thereof in the meridian direction of the tire is 80 to 130% of the ground contact width of the tire.

6. A pneumatic radial tire for a passenger car according to claim 1, wherein said aramid fiber cord has been subjected to a surface treatment with an epoxy resin and resorcin/formalin/latex (RFL).

7. A pneumatic radial tire for a passenger car according to claim 1, wherein said belt layers each comprise a tire cord fabric in the form of a reed screen and the thickness of the coat rubber covering the tire cord fabric is 0.1 to 1.0 mm larger than the cord diameter of the aramid fiber.

* * * * *